United States Patent
Zeyher

(10) Patent No.: US 11,121,613 B2
(45) Date of Patent: Sep. 14, 2021

(54) DYNAMIC ELECTRICAL GENERATOR AND ITS ASSOCIATED METHOD OF OPERATION

(71) Applicant: Craig H. Zeyher, Haddonfield, NJ (US)

(72) Inventor: Craig H. Zeyher, Haddonfield, NJ (US)

(*) Notice: Subject to any disclaimer, the term of this patent is extended or adjusted under 35 U.S.C. 154(b) by 631 days.

(21) Appl. No.: 15/984,080

(22) Filed: May 18, 2018

(65) Prior Publication Data

US 2018/0337583 A1 Nov. 22, 2018

Related U.S. Application Data

(60) Provisional application No. 62/603,141, filed on May 19, 2017, provisional application No. 62/603,770, (Continued)

(51) Int. Cl.
*H02K 23/60* (2006.01)
*H02K 23/68* (2006.01)
(Continued)

(52) U.S. Cl.
CPC .......... *H02K 23/60* (2013.01); *H02K 16/005* (2013.01); *H02K 23/66* (2013.01); *H02K 23/68* (2013.01);
(Continued)

(58) Field of Classification Search
CPC ........ H02K 23/60; H02K 23/68; H02K 23/66; H02K 53/00
(Continued)

(56) References Cited

U.S. PATENT DOCUMENTS

| 5,313,850 A | 5/1994 | Finvold et al. |
| 2004/0134190 A1* | 7/2004 | Kanki ..................... F03B 13/20 60/398 |

(Continued)

FOREIGN PATENT DOCUMENTS

| WO | WO 2014104938 | 7/2014 | |
| WO | WO-2014104938 A1 * | 7/2014 | ............. G01C 19/16 |

OTHER PUBLICATIONS

WO-2014104938-A1 (Translation) (Year: 2014).*

*Primary Examiner* — Quyen P Leung
*Assistant Examiner* — Alexander Moraza
(74) *Attorney, Agent, or Firm* — LaMorte & Associates, P.C.

(57) ABSTRACT

A generator system having a dynamo that contains an armature, a stator and a housing. The armature rotates about a first axis of rotation. The stator is concentrically positioned around the armature. Both the armature and the stator are free to rotate in opposite directions about the first axis of rotation. The housing of the dynamo is connected to a motor that can rotate the dynamo around a second axis of rotation. There is an angle of inclination between the first axis of rotation and the second axis of rotation. This angle of inclination is selectively altered during operation. By changing the angle of inclination between the two axes of rotation, a precession can be created that adds rotational energy to both the armature and the stator. This increases the output of the dynamo and creates a highly efficient electrical generator.

12 Claims, 7 Drawing Sheets

Related U.S. Application Data filed on Jun. 12, 2017, provisional application No. 62/604,733, filed on Jul. 19, 2017, provisional application No. 62/604,893, filed on Jul. 26, 2017, provisional application No. 62/605,559, filed on Aug. 18, 2017, provisional application No. 62/605,708, filed on Aug. 24, 2017, provisional application No. 62/606,819, filed on Oct. 10, 2017, provisional application No. 62/606,992, filed on Oct. 16, 2017, provisional application No. 62/707,664, filed on Nov. 13, 2017, provisional application No. 62/709,853, filed on Feb. 5, 2018.

(51) Int. Cl.
*H02K 23/66* (2006.01)
*H02K 53/00* (2006.01)
*H02K 16/00* (2006.01)

(52) U.S. Cl.
CPC ......... *H02K 53/00* (2013.01); *H02K 2201/18* (2013.01)

(58) Field of Classification Search
USPC .......................................... 310/115, 117, 116
See application file for complete search history.

(56) References Cited

U.S. PATENT DOCUMENTS

| | | | |
|---|---|---|---|
| 2008/0048455 A1* | 2/2008 | Carney | F03D 5/06 290/54 |
| 2010/0236849 A1* | 9/2010 | Wishart | H01R 39/643 180/65.51 |
| 2011/0041628 A1* | 2/2011 | Ozturk | F16H 33/10 74/5.47 |
| 2012/0262016 A1* | 10/2012 | Wang | H02K 7/12 310/77 |

\* cited by examiner

DYNAMIC ELECTRICAL GENERATOR AND ITS ASSOCIATED METHOD OF OPERATION

RELATED APPLICATIONS

This application claims the priority of the following provisional patent applications:

U.S. Provisional Application No. 62/603,141, filed May 19, 2017;

U.S. Provisional Application No. 62/603,770, filed Jun. 12, 2017;

U.S. Provisional Application No. 62/604,733, filed Jul. 19, 2017;

U.S. Provisional Application No. 62/604,893, filed Jul. 26, 2017;

U.S. Provisional Application No. 62/605,559, filed Aug. 18, 2017;

U.S. Provisional Application No. 62/605,708, filed Aug. 24, 2017;

U.S. Provisional Application No. 62/606,819, filed Oct. 10, 2017;

U.S. Provisional Application No. 62/606,992, filed Oct. 16, 2017;

U.S. Provisional Application No. 62/707,664, filed Nov. 13, 2017; and

U.S. Provisional Application No. 62/709,853, filed Feb. 5, 2018.

BACKGROUND OF THE INVENTION

1. Field of the Invention

In general, the present invention relates to electrical generators wherein conductive windings on an armature are moved through a magnetic field to produce electricity. More particularly, the present invention relates to electrical generators where both the electrical windings and the source of the magnetic field are in motion as electricity is generated.

2. Prior Art Description

It is well known that moving a coil of conductive wire through a magnetic field induces a flow of electricity in the conductive wire. Most electrical generators operate on this principle, wherein an armature of coiled wire is rotated within a stator that contains either permanent magnets or field magnets. It is very desirable to create a generator that converts mechanical rotational energy into electricity in an efficient manner. The efficiency of an electrical generator directly relates to the cost associated with running the generator. That is, efficient electrical generators take less power to run and can, therefore, be run at a lower cost.

Often, the efficiency of a generator is improved by altering the windings on the armature or the magnetic fields produced by the stator. However, another way to improve the efficiency of a generator is to add some mechanism that increases or prolongs the ability of the armature to spin. For example, in many manually operated handheld generators, a hand crank is typically used to turn a flywheel. The flywheel, in turn, rotates the armature. The flywheel, prolongs the period of time that the armature turns so the user does not have to constantly move the crank.

In the prior art, the armatures of electrical generators have been attached to most every device that can produce rotational energy, including gyroscopes. Such prior art is exemplified by U.S. Pat. No. 5,313,850 to Finvold and International Patent Publication No. WO/2014/104938 to Zaytsev.

However, in such prior art, the armature of a generator is attached to a gyroscopic system, and receives rotational energy from the gyroscope. The generator itself is not part of the gyroscopic system.

The Applicant has discovered a configuration for an electrical generator, wherein the components of the generator are dynamically set into motion as part of a larger gyroscopic system. This increases the rotational speed of the components, therein resulting in a more efficient generation of electrical power. This improved generator system is described and claimed below.

SUMMARY OF THE INVENTION

The present invention is a generator system that converts mechanical energy into electricity. The generator system has a dynamo that contains an armature, a stator and a housing. The armature rotates about a first axis of rotation. The stator is concentrically positioned around the armature. Both the armature and the stator are free to rotate about the first axis of rotation within the housing. During operation, the armature and the stator rotate in opposite directions around the first axis of rotation.

The housing that holds the armature and the stator is connected to a motor that can rotate the dynamo around a second axis of rotation. As such, the armature and the stator rotate around both the first axis of rotation and the second axis of rotation. There is an angle of inclination between the first axis of rotation and the second axis of rotation. This angle of inclination can be selectively altered during operation.

As the armature and the stator spin, gyroscopic forces are created as are complex magnetic fields. By changing the angle of inclination between the two axes of rotation, a precession can be created that adds rotational energy to both the armature and the stator. This increases the output of the dynamo and creates a highly efficient electrical generator.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

The present invention generator can be configured in many ways and can be adapted for use in many applications. For example, the electrical generator can be used by a utility company to generate electricity for a power grid. Much small versions can be used to generate electricity for home use or to provide electrical power to a boat or vehicle. Although the generator can be used in many such applications, only one exemplary system is illustrated and described. The exemplary embodiment is selected in order to set forth one of the best modes contemplated for the invention. The illustrated embodiment, however, is merely exemplary and should not be considered a limitation when interpreting the scope of the appended claims.

Figure 1:
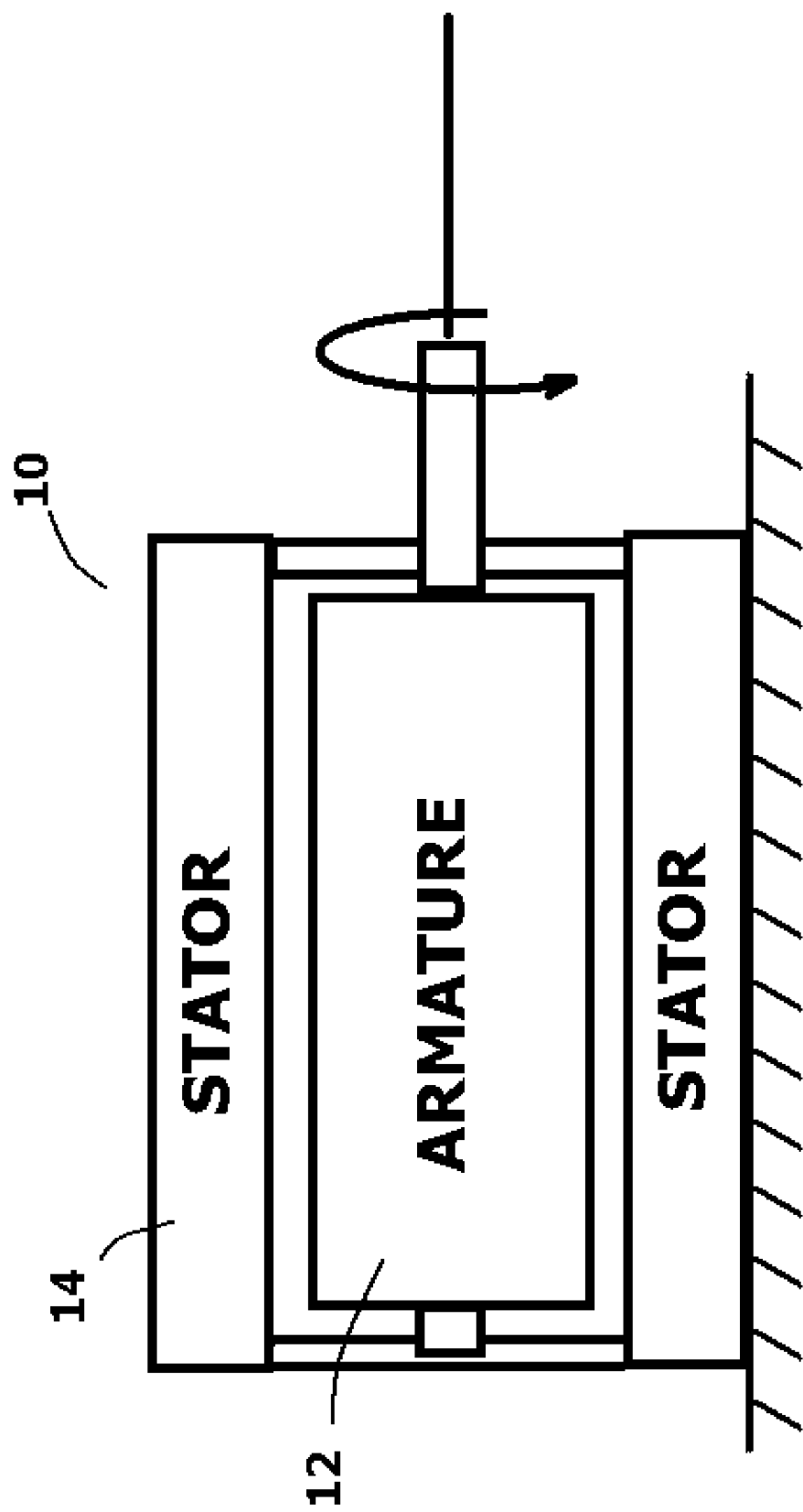
FIG. 1 is a schematic of a traditional prior art dynamo that contains an armature set in a fixed stator.

Referring to FIG. 1, a traditional prior art generator 10 is illustrated as a comparative reference. The generator 10 has an armature 12 that rotates within a stator 14. The armature 12 rotates, while the stator 14 remains stationary. The armature 12 contains various windings of copper or some other conductive metal wire. The stator 14 contains permanent magnets or field magnets that are powered by the armature 12 via the process of self-excitation. The stator 14 generates a magnetic field. The armature 12 rotates through the magnetic field, whereby electricity is generated in windings of the armature 12.

In such a traditional electrical generator 10, the armature 12 is the only part of the generator 10 that rotates. It has been discovered that the efficiency of an electrical generator can be significantly increased if other aspects of the electric generator are also placed into motion.

Figure 2:
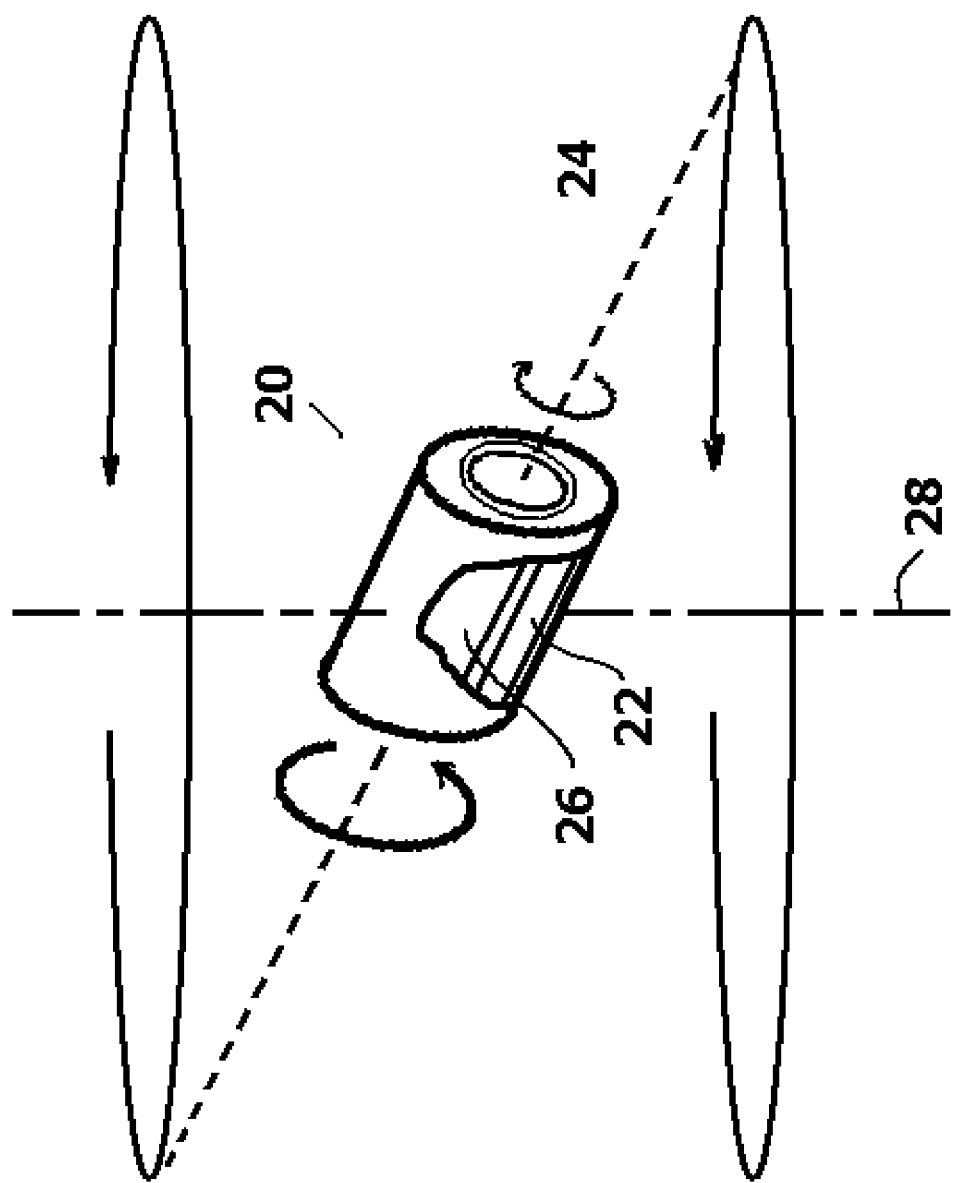
FIG. 2 is a schematic showing the dynamic rotational movements of a dynamo as part of the present invention generator system.

Referring to FIG. 2, a generator system 20 is shown where an armature 22 rotates in a first direction about a first axis of rotation 24. Additionally, a stator 26 is concentrically positioned around the armature 22. The stator 26 is caused to rotate about the same axis of rotation 24 in the opposite direction. Accordingly, the armature 22 and the stator 26 are simultaneously rotating in opposite directions. This creates a higher relative speed of rotation and a corresponding higher output in electrical power. Additionally, the subassembly of the armature 22 and the stator 26 is inclined while spinning. The subassembly is then spun around a second axis of rotation 28. This causes a gyroscopic procession that increases the rotational speed of the armature 24 and stator 26. Consequently, more electrical power is produced. The result is a generator system 20 that produces more power and is more efficient than generators with equally sized armatures but with stationary stators.

Figure 3:
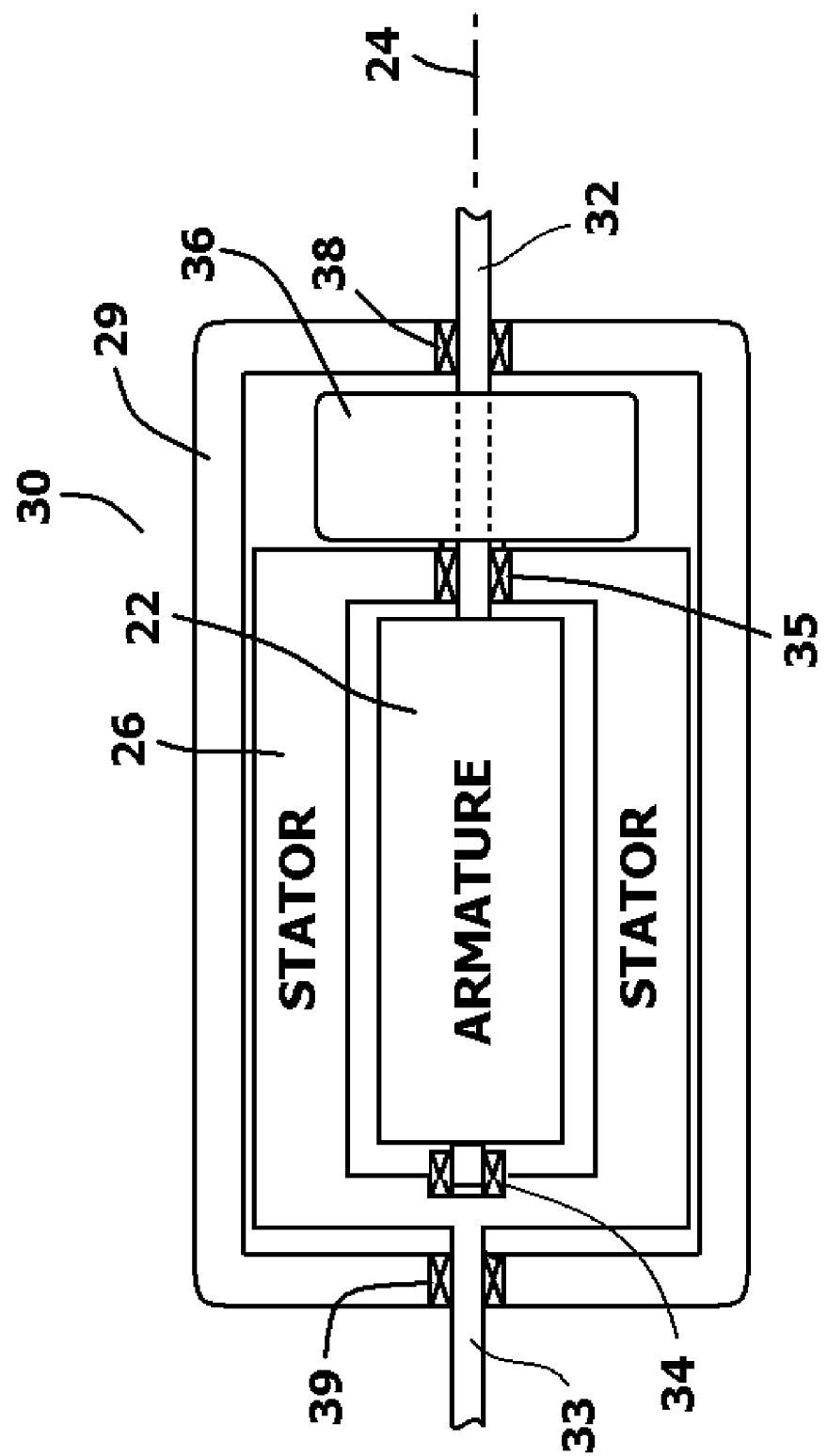
FIG. 3 is a schematic showing the moving components within a dynamo as utilized by the present invention generator system.

Referring to FIG. 3, it can be seen that the armature 22 and the stator 26 of the generator system 20 are held within a housing 29. The armature 22, stator 26 and housing 29 form a dynamo subassembly 30. The armature 22 rotates about an armature axle 32. The armature axle 32 extends along the first axis of rotation 24. Likewise, the stator 26 rotates about a stator axle 33. The stator axle 33 extends along the first axis of rotation 24. The armature axle 32 is suspended within the stator 26 and housing 29 by bearings 34, 35, and 38 respectively. The bearings 34, 35 located within the stator 26 enable the armature 22 to rotate within the confines of the stator 26 and the housing 29. A drive motor 36 is provided that can be used to rotate the armature axle 32, stator 26 and the armature 22. The drive motor 36 can selectively disengage the armature axle 32 and/or stator 26 should the armature 22 or any of these components be induced to rotate above the operational speed of the drive motor 36.

The armature 22 is surrounded by the stator 26. The stator 26 contains either permanent magnets or field magnets. The stator 26 is supported by bearings 39. As such, the stator 26 can rotate about the armature 22. Arranged in this manner, both the armature 22 and the stator 26 can rotate around the first axis of rotation 24, which is concentric with the armature axle 32 and stator axle 33. The housing 29 surrounds the armature 22 and the stator 26, completing the dynamo subassembly 30.

Figure 4:
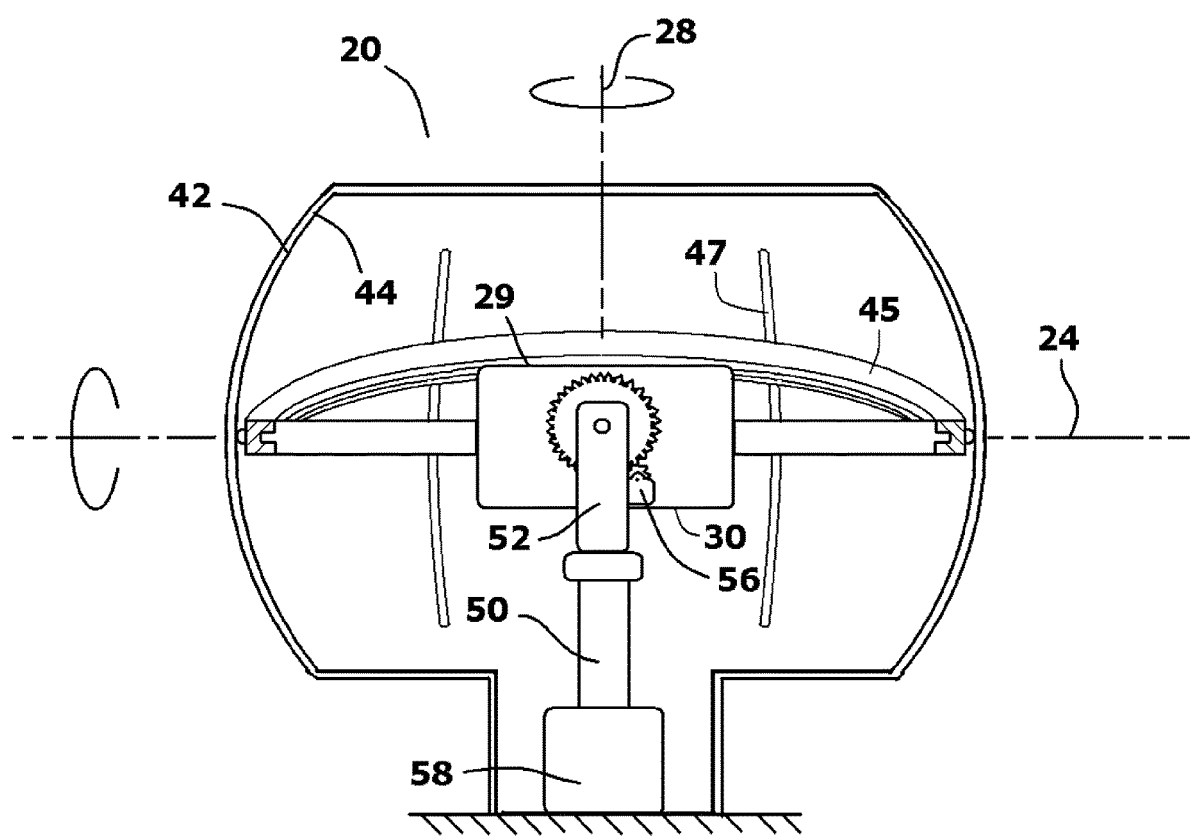
FIG. 4 is an exemplary embodiment of the generator system in a first configuration.
Figure 5:
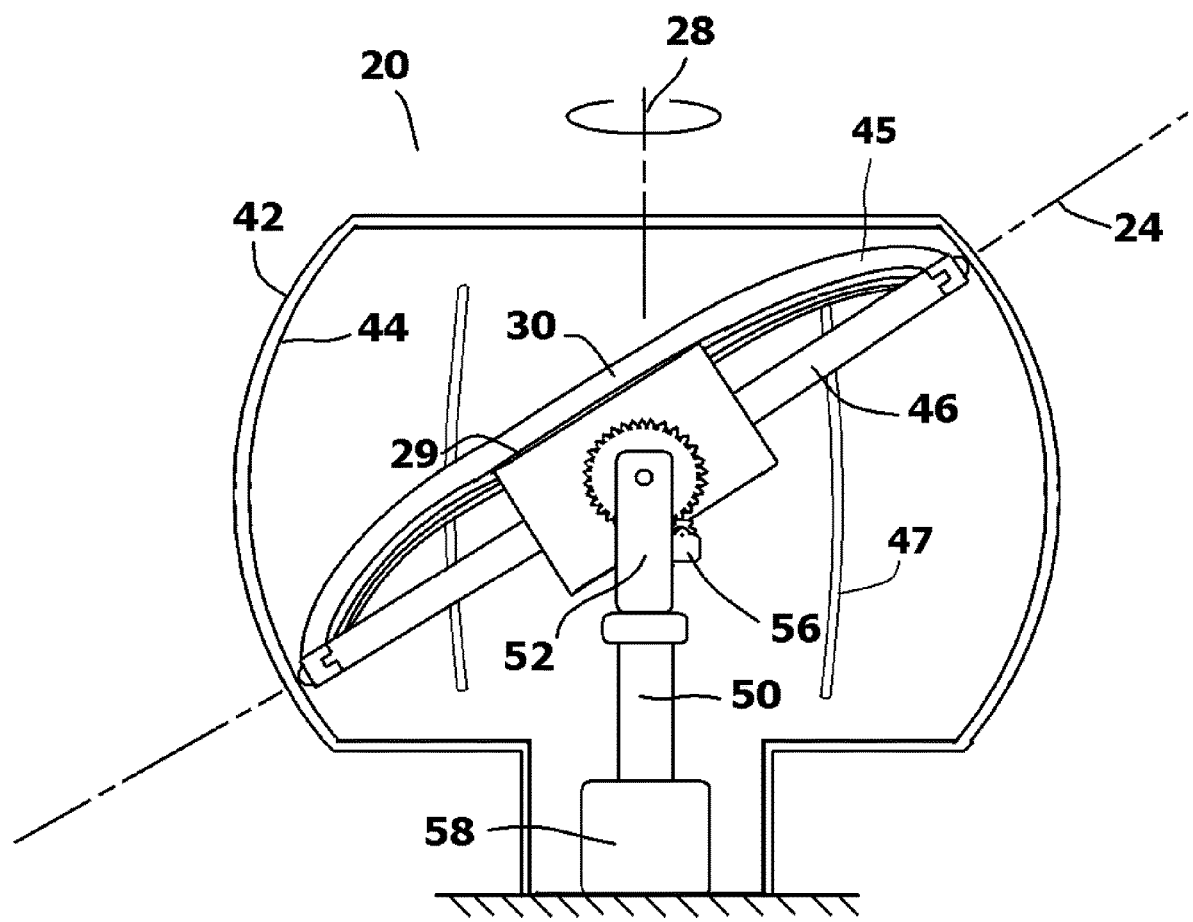
FIG. 5 is the exemplary embodiment of the generator system in a second configuration.

Referring to FIG. 4 and FIG. 5 in conjunction with FIG. 3, it can be seen that a containment shell 42 surrounds the dynamo subassembly 30. The containment shell 42 has a spherically curved interior surface 44 with grooves to accommodate rollers, bearings or some other device that enables a disc-shaped friction plate 45 mounted within to resist lateral movement but accommodate an undulating motion with a minimum amount of energy lost to friction. The disc-shaped friction plate 45 is guided by guide slots 47 in the containment shell 42.

Armature axle 32 and stator axle 33 extend out from the dynamo subassembly 30 to engage the friction plate 45. Upon the activation of motor drive 36 and/or motor drive 58 rotation of armature 22 and stator 26 begins. The stator axle 33 and armature axle 32 in contact with the circular friction plate 45 in a manner that enables the armature 22 and stator 26 rotation in opposite directions to each other while being in synchronies circular motion on the friction plate 45.

A support column 50 is provided. A gimbal 52 is set atop the support column 50. The housing 29 of the dynamo subassembly 30 is set into the gimbal 52. The gimbal 52 enables the dynamo subassembly 30 to rotate in a second axis of rotation 28 which is in the vertical plane. As such, the extensions 46 and the dynamo subassembly 30 can be tilted out of the horizontal plane and into an inclined plane. The stator axle 33 and armature axle remain in contact with the friction plate 45 regardless of the angle of inclination. The tilt of the dynamo subassembly 30 in the gimbal 52 is controlled by a tilt mechanism 56. The tilt mechanism 56 can be a geared control, a lever, a hydraulic arm or any other device capable of rotating the dynamo subassembly 30 to a selected inclined angle within the gimbal 52.

The support column 50 extends below the center of gravity of the dynamo subassembly 30. The wiring for directing power to and from the dynamo subassembly 30 extends through the support column 50. The support column 50 is rotated by a motor 58 outside of the rotational zone. The external motor 58 rotates the gimbal 52 and the dynamo subassembly 30 around the second axis of rotation 28. Motor drive 58 can be engaged or disengaged from driving the subassembly rotation as desired.

With reference to all prior figures, the operation of the generator assembly 20 is herein described. At the start of operations, power is supplied to motor 36 and/or motor 58. Using the drive motor 36 or motor drive 58, the armature 22 and stator 26 are rotated about the armature axle 32 at the operational speed of the drive motor 36 or motor drive 58. Due to the mechanical arrangement of stator axle 33 and armature axle 32 riding upon the common friction plate 45 as previously described and Newton's third law of motion, the stator 26 and armature 22 will rotate in opposite directions. This is because the magnetic fields causing the armature 22 to rotate in a first direction will have the equal and opposite effect on the surrounding stator 26, therein causing the stator 26 to rotate in the opposite direction.

Once both the armature 22 and the stator 26 are rotating within the dynamo subassembly 30, both the armature 22 and the stator 26 act as gyroscopes. Once rotating, the plane of rotation for the dynamo subassembly 30 can be inclined, therein inclining the first axis of rotation 24. As such, both the armature 22 and the stator 26 are rotating together about the vertical second axis of rotation 28, while they are rotating opposite each other along the now inclined first axis of rotation 24.

The armature 22 and the stator 26 have a common gyroscopic procession as they rotate about the second axis of rotation 28. However, the armature 22 and the stator 26 are rotating in opposite directions in the first axis of rotation 24. The result is the generation of a complex interplay of magnetic fields that acts to increase the procession about the second axis of rotation 28. As the procession about the second axis of rotation 28 is increased, the gyroscopic forces experienced within the dynamo subassembly 30 also increase. This produces an increase in the rotational speed of the armature 22 and the stator 26 within the dynamo subassembly 30. The increase of rotational speed induced in the armature 22 and the stator 26 results in greater electrical output and a corresponding increase in magnetic strength between components. This in urn creates still greater driving force and electrical and magnetic output. This cycle continues until either electrical or mechanical power is taken from the spinning generator system 10.

Upon a sufficiently large amount of torque the friction element between stator axle 33, armature axle 32 and the surface of the friction ring 45 will also act to speed up rotation.

Figure 6:
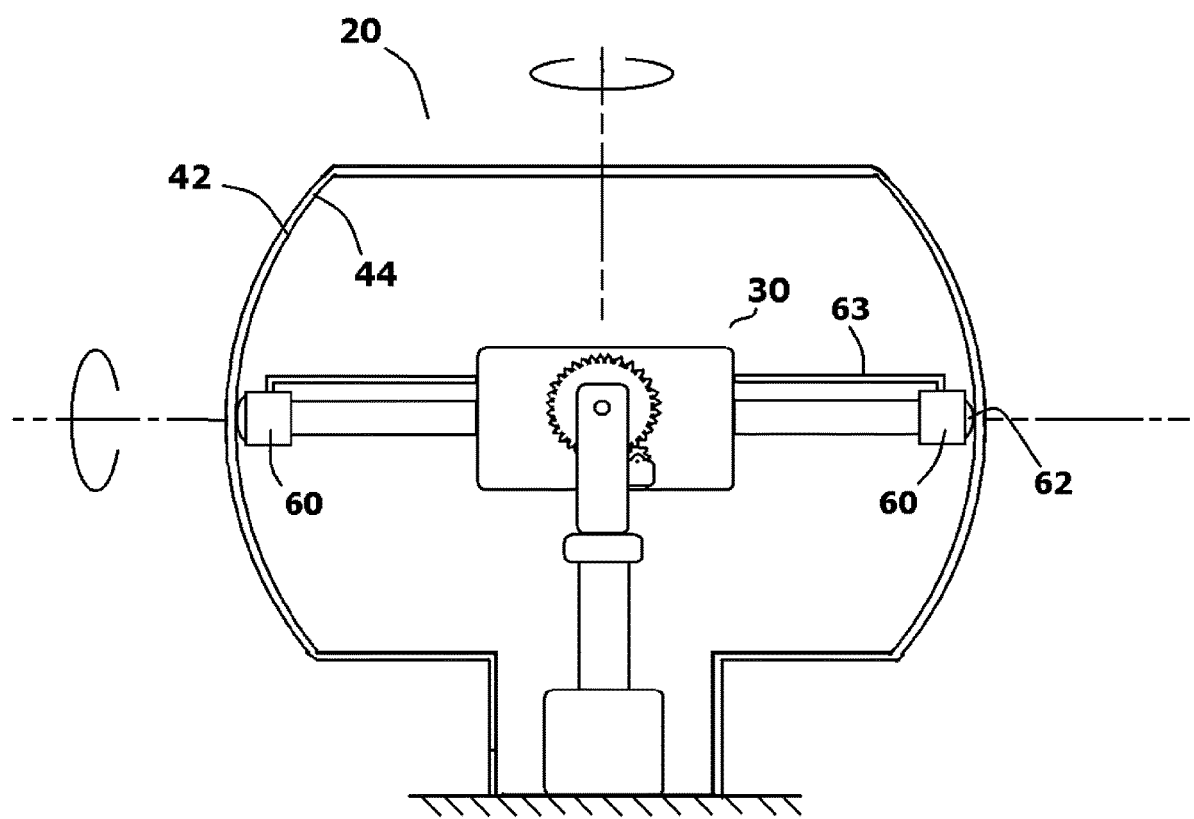
FIG. 6 shows a variation of the generator system.
Figure 7:
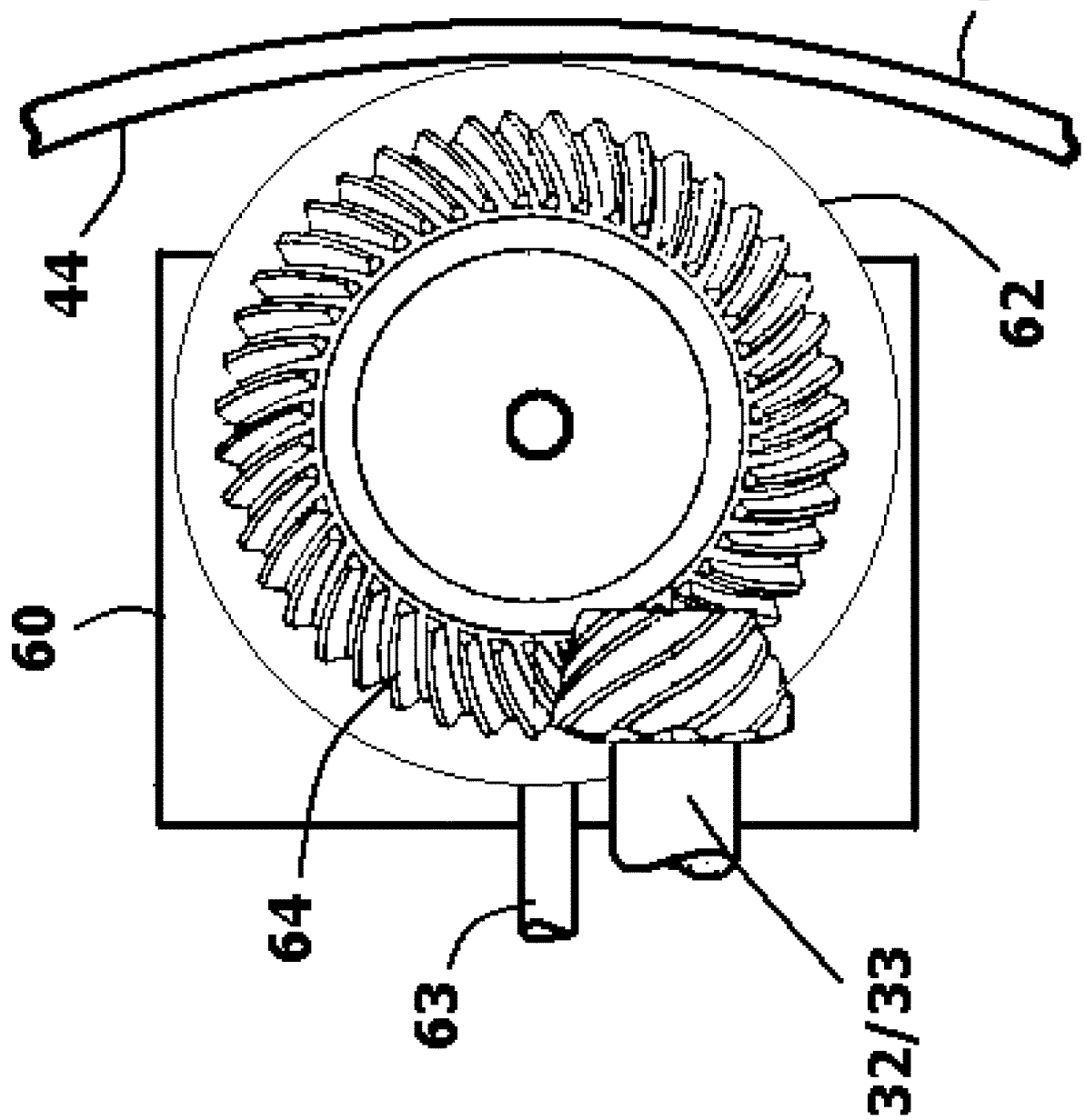
FIG. 7 shows the axle terminations used in the generator system of FIG. 6.

Referring to FIG. 6 in conjunction with FIG. 7, an alternate system for terminating the armature axle 32 and the stator axle 33 is shown. The armature axle 32 and stator axle 33 extend out from the dynamo subassembly 30 to gear boxes 60. The gear boxes 60 translate the rotational movement to wheels 62 that can run on the curved interior surface 44 of the containment shell 42. Within the gear boxes 62 are gears 64 that transfer the rotational energy to the wheels 62. The use of the gear boxes 60 may require the addition of stabilizer arms 65. Although beveled gears 64 are shown, it will be understood that many other gear types and configurations can be used that alternate the plane of rotation by ninety degrees. Upon the rotation of the stator axle 33 and armature axle 32, the wheels 62 rotate while in contact with the curved interior surface 44. The gear boxes 60 enable the armature 22 and stator 26 rotation in opposite directions to each other while being in synchronies circular motion It will be understood that the embodiments of the present invention that are illustrated and described is merely exemplary and that a person skilled in the art can make many variations to those embodiments. All such embodiments are intended to be included within the scope of the present invention as defined by the appended claims.

What is claimed is:

1. A generator system comprising:
   an armature that rotates about a first axis of rotation;
   a stator concentrically positioned about said armature, wherein said stator rotates about said first axis of rotation;
   a housing for supporting said armature and said stator, wherein both said armature and said stator rotate about said first axis of rotation within said housing;
   a motor for rotating said housing about a second axis of rotation that is different from said first axis of rotation;
   axles that extend from said housing and rotate with said housing about said second axis of rotation;
   a containment shell that surrounds said housing, wherein said axles contact said containment shell as said housing rotates about said second axis of rotation; and
   a guide disposed on said containment shell for guiding said axles as said housing rotates.

2. The generator system according to claim 1, further including a gimbal mount for said housing that enables said housing to be selectively inclined, therein inclining said first axis of rotation.

3. The generator system according to claim 2, further including a mechanism for selectively moving said housing in said gimbal mount, therein controlling an angle of inclination for said first axis of rotation.

4. The generator system according to claim 3, wherein said armature rotates about an armature axle and said stator rotates about a stator axle, wherein said armature axle and said stator axle are said axles that extend from said housing and rotate with said housing about said second axis of rotation.

5. The generator system according to claim 1, wherein said armature rotates about said first axis of rotation in a first direction and said stator rotates about said first axis of rotation in an opposite second direction.

6. The generator system according to claim 1, further including a brake to selectively stop said stator from rotating about said first axis of rotation.

7. A generator system comprising:
   a dynamo having an armature and stator that rotate in opposite directions around a common first axis of rotation;
   a motor for rotating said dynamo around a second axis of rotation, wherein an angle of inclination exists between said first axis of rotation and said second axis of rotation;
   axles that extend from said dynamo and rotate with said dynamo about said second axis of rotation;
   a containment shell that surrounds said dynamo, wherein said axles contact said containment shell as said dynamo rotates about said second axis of rotation; and
   a guide disposed on said containment shell for guiding said axles as said dynamo rotates.

8. The generator system according to claim 7, further including a tilt mechanism for selectively adjusting said angle of inclination.

9. The generator system according to claim 8, further including a gimbal mount for said dynamo that enables said dynamo to be selectively inclined by said tilt mechanism.

10. The generator system according to claim 7, further including a brake to selectively stop said stator from rotating about said first axis of rotation.

11. A generator system comprising:
    an armature that rotates about a first axis of rotation;
    a stator concentrically positioned about said armature, wherein said stator rotates about said first axis of rotation; and wherein said stator is caused to rotate about said first axis of rotation in a direction opposite said armature by magnetic field forces generated between said armature and said stator; and
    a housing that holds said armature and said stator, wherein said housing rotates around a second axis of rotation and an angle of inclination exists between said first axis of rotation and said second axis of rotation;
    a motor for rotating said housing about a second axis of rotation that is different from said first axis of rotation;
    axles that extend from said housing and rotate with said housing about said second axis of rotation;
    a containment shell that surrounds said housing, wherein said axles contact said containment shell as said housing rotates about said second axis of rotation; and
    a guide disposed on said containment shell for guiding said axles as said housing rotates.

12. The generator system according to claim 11, further including a tilt mechanism for tiling said housing and selectively adjusting said angle of inclination.

* * * * *